UNITED STATES PATENT OFFICE.

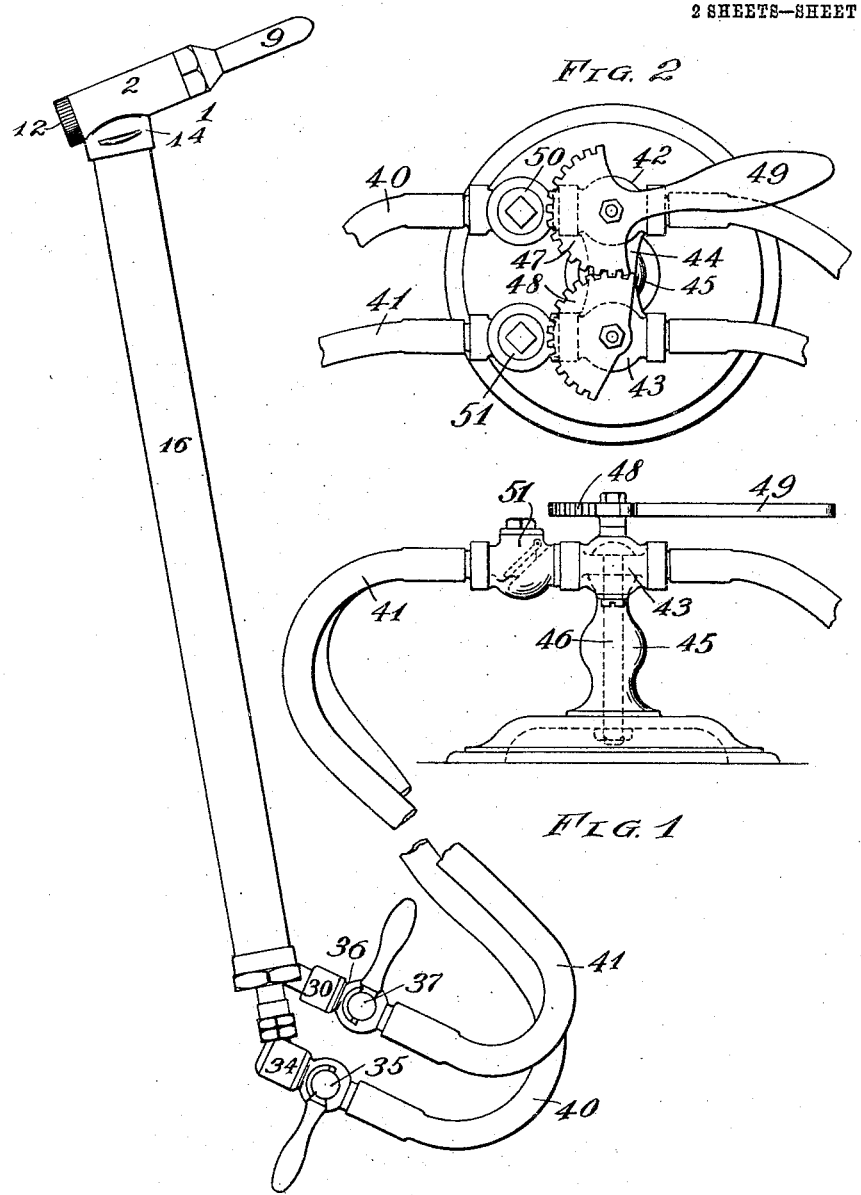

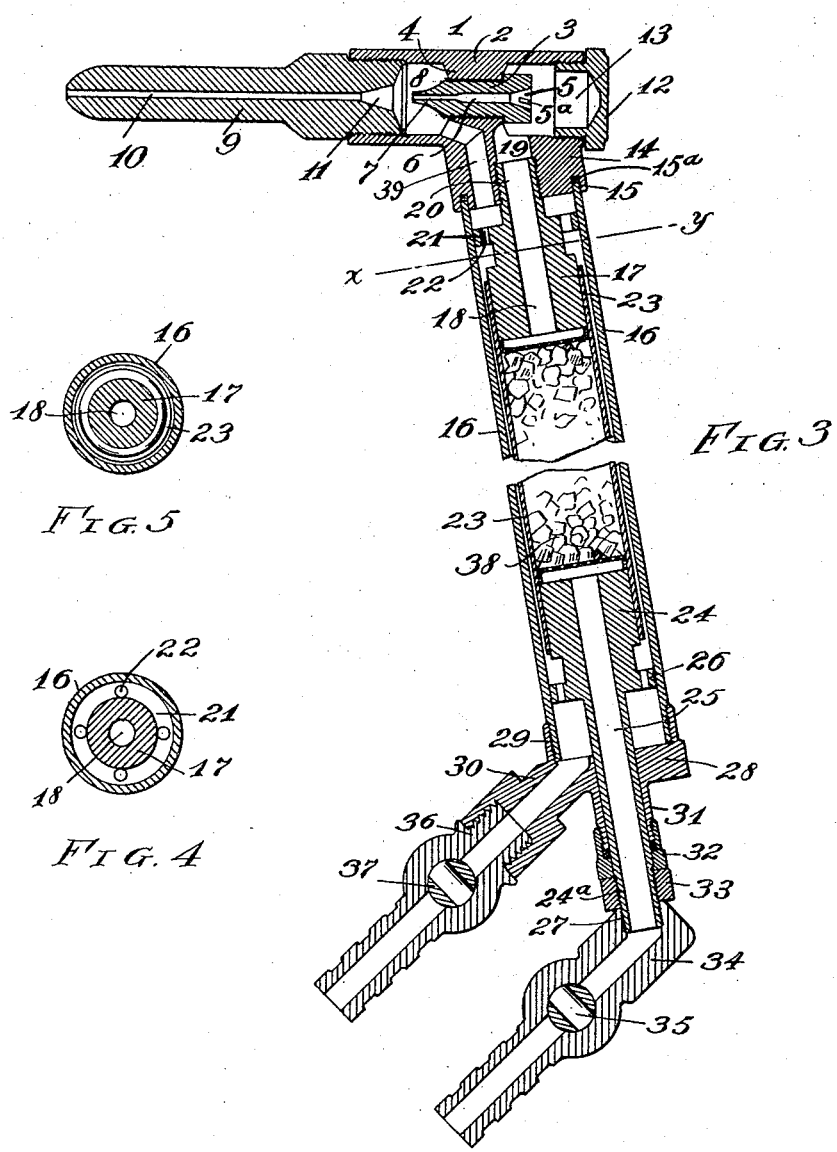

JOHN HARRIS, OF CLEVELAND, OHIO.

BLOWPIPE.

948,323.  Specification of Letters Patent.  Patented Feb. 8, 1910.

Application filed April 5, 1909. Serial No. 487,883.

*To all whom it may concern:*

Be it known that I, JOHN HARRIS, a citizen of the United States, residing at Cleveland, in the county of Cuyahoga and State of Ohio, have invented a certain new and useful Improvement in Blowpipes, of which the following is a full, clear, and exact description, reference being had to the accompanying drawings.

This invention relates to blow pipes and more especially to oxy-acetylene blow pipes, which are adapted for use in various arts and are employed where high temperatures are desirable or necessary, for the purposes of welding, etc.

The general objects of the invention are to provide a blow pipe of this character in which the liability to "flash back" will not only be reduced to a minimum, but such immunity from flashing back will be secured without the necessity of subjecting the acetylene to a pressure greater than that used in generators for ordinary lighting purposes; also to provide a blow pipe of this character with means whereby it may be repeatedly operated after having once been adjusted to the pressures of the gases employed therein without the necessity for adjusting valves; also to provide a blow pipe of this general character with means whereby, in case a mixture of gas and oxygen should be produced and ignited, the explosion will not be propagated into the apparatus by means of which the pipe is supplied with its gases.

Other objects of my invention are to secure economy of consumption of oxygen, efficiency of operation, and simplicity of construction.

Generally speaking the invention may be defined as consisting of the combinations of elements embodied in the claims hereto annexed and illustrated in the drawings forming a part hereof, wherein:

Figure 1 represents a side elevation of a blow pipe and the supply connections therefor constructed in accordance with my invention; Fig. 2 represents a plan view of the valves for admitting the gases to the blow pipe; Fig. 3, an enlarged longitudinal sectional view through such pipe; Fig. 4, a sectional detail on the line $x$—$y$ looking upward, and Fig. 5 is a similar view on the same line looking downward.

Describing the parts in connection with reference characters, 1 denotes the blow pipe proper, the same comprising a casing 2 having its opposite ends internally threaded and each provided with a chamber. The casing 2 is provided with a nozzle 3 carried by a web 4 extending transversely of the casing. This web is provided with an internally threaded bore for the reception of a corresponding external thread on the nozzle. By this construction, nozzles of varying capacity may be applied to the web to adapt the blow pipe to varying capacities of flame.

The nozzle 3 is provided with a bore extending longitudinally therethrough. This bore is enlarged at the rear end, as shown at 5, and tapers forwardly, where it merges with the more restricted portion 6, which in turn merges with the narrower bore 7 extending through the front end of the nozzle. The front end of the nozzle is tapered, as shown, and discharges into a mixing chamber 8 provided in the casing 2 between the web 4 and the rear portion of the nozzle 9. The rear end of the bore is provided with a slot $5^a$ for the application of a screw driver.

The nozzle 9 is preferably threaded into the threaded end of casing 2 and is provided with an elongated mixing bore 10 extending therethrough, the rear end of such bore being frusto-conical, as shown at 11, communicating with the mixing chamber 8.

The rear end of casing 2 is closed by a plug 12, which is shown as threaded into said casing and forms with the rear end of nozzle 3 a chamber 13. The casing 2 is also provided with an extension 14, preferably integral therewith, and said extension is provided with an annular groove 15 in its lower surface. This groove is for the reception of an elongated casing 16, the upper end whereof is adapted to fit within said groove.

17 denotes a plug having a bore 18 therethrough communicating at its upper end, through a port 19, with the chamber 13. The upper end of the plug 17 is reduced, as shown at 20, and provided with a thread on such reduced end whereby it may be fitted into the projection 14. The plug 17 is provided with a centering flange 21, adapted to fit snugly the bore of casing 16, and this flange is provided with a plurality of ports 22. Below the flange 21, the body of the plug is reduced in diameter and is then enlarged to form a close joint with the upper end of a conduit 23. The conduit 23 has snugly fitted in the lower end thereof a plug 24 having a bore 25 therethrough. This plug is provided with a flange 26 similar to flange 21, the latter flange forming a centering means for the casing 16. The plug is extended below the flange 26 for a considerable distance to form a tubular extension, and this tubular extension is provided at its lower end with a thread 27.

28 denotes a closure provided with a threaded flange 29 for the lower end of casing 16. Closure 28 is provided with a bore for the tubular extension 24$^a$ of plug 24 and is also provided with a tubular projection 30, preferably integral therewith. The closure 28 is also provided with an extension 31 for the threaded upper end of a stuffing box 32.

33 denotes a nut which is threaded on the lower end of extension 24$^a$. By the adjustment of this nut, the casing 16 is forced snugly into its recess 15, which recess may be provided with an asbestos packing washer 15$^a$ whereby leakage will be prevented. At the same time, the blow pipe proper can be rotated with respect to the casing 16, the connection between the extension 14 and the casing 16 providing a swivel joint at this point. The lower end of 24$^a$ projects through the nut 33 and has fitted thereto the connection 34 by means of which oxygen is supplied to the blow pipe. This connection is provided with a valve 35. A similar connection 36 for acetylene is threaded into the lower end of 30 and is provided with a valve 37. The interior of the conduit 23 is filled with material 38, preferably broken pumice-stone. A port 39 connects the chamber 8 with the upper end of the casing 16. The connections 34 and 36, as previously stated, are for the supply of oxygen and acetylene respectively to the blow pipe.

With the apparatus constructed as thus far described, the operation is as follows: Acetylene passes through the valve 37, through the apertures in flange 26 and through the restricted annular space formed between the casing 16 and conduit 23, thence through apertures 22 in flange 21 and through port 39 into the chamber 8. The oxygen flows through the valve 35, bore 25, the conduit 23, bore 18 and port 19 into the chamber 13. It passes through the nozzle 3 and is projected centrally into the acetylene in chamber 8, and the mixture thus formed is discharged through bore 10. It will be seen that the conduit 23 forms with the casing 16 a restricted passageway, the annular passageway formed between said conduit and casing being so narrow as to prevent the propagation of flame therethrough. In practice, the width of this passageway should not exceed $\frac{1}{32}$ inch. The pumice-stone in conduit 23 causes the oxygen to spread out in the conduit and to pass in contact with the walls of the same thereby cooling the acetylene and thus decreasing the liability to "flash back."

The packing of the conduit 23 with pumice-stone so restricts the capacity of the conduit that, when the supply of oxygen is cut off at the valve 37, the waste of oxygen between such valve and the blow pipe outlet is very inconsiderable, while none of the advantages of the elongation and enlargement of the conduit are sacrificed. Another and important advantage, due to the location of the annular passageway between the casing 16 and the conduit 23 in the supply portion of the blow pipe instead of in the pipe itself, is the feasibility of making such passageway of practically unlimited length. This enables me to provide a width of annular passageway sufficient to accommodate low pressure acetylene, such as is supplied from ordinary lighting generators, in quantity to maintain any desired flame and preserve a velocity of the gases through the tube 10 greater than the velocity of propagation through the same tube. Furthermore, the ability to secure any desired length of annular passageway between 16 and 23 enables me to vary the width of such passageway (proportional to its length) to accommodate any capacity of blow pipe. At the same time, the casing 16 provides a very convenient means for manipulating the blow pipe by one hand only. Furthermore, the swivel joint provided between the upper end of the casing 16 and extension 14 enables the pipe to be operated with the valve connections at such angle as to prevent the kinking of the flexible tubing extending therefrom.

With the aforesaid blow pipe I provide an additional valve arrangement whereby, when the valves 35 and 37 have been once adjusted to secure proper conditions at the blow pipe nozzle, such valves need not thereafter be adjusted to insure a continuance of such conditions. I also provide the blow pipe with a safety device whereby, should it happen that the outlet becomes clogged and a mixture of oxygen and acetylene should pass into the flexible pipes extending from the connections 34 and 36, no damage to the apparatus will be incurred.

The flexible pipes referred to are shown at 40 and 41 and are connected respectively with the connections 34 and 36. The ends of these pipes opposite the connections 34 and 36 are attached to a valve fitting. This fitting comprises a pair of valves 42 and 43, each of which is provided with a flexible pipe leading to a tank, the former to the oxygen tank and the latter to the acetylene tank. These valves are connected, as by means of a web 44, which is secured to a common standard 45, as by means of a bolt 46. The valves 42 and 43 will be provided with intermeshing gear segments, 47 and 48 respectively, and one of said segments will be provided with an operating handle 49. Between each of the valves 42 and 43 and its flexible connection leading to the blow pipe there is interposed a check valve 50 and 51 respectively. By means of valves 42 and 43, segments 47 and 48 and operating handle 49, when once the valves 35 and 37 have been set to secure the proper proportions between the oxygen and acetylene, it will be necessary only for the operator to throw the handle 49 in the proper direction to open and close the valves 42 and 43. No relative adjustment of valves will thereafter be necessary, the operation of the handle 49 controlling the rate of flow of the gases while the valves 35 and 37 will maintain the proportions therebetween.

Should the blow pipe outlet become clogged, or should some other circumstance cause the oxygen to travel back and mix with the acetylene in its conduits and should a leak occur in the conduit containing this mixture, then the escaping mixture might catch fire and an explosion occur within the conduit including the flexible pipe. This explosion will be transmitted backwardly only as far as the check valve in the pipe in which the explosion may occur and no damage will be done to the supply apparatus.

By the construction described herein it will be apparent that I have produced a particularly efficient form of blow pipe and one wherein the liability of "flashing back" will be reduced to a minimum; one which will deliver the acetylene to the blow pipe in such condition as to secure proper and complete combustion thereof, and one which will not only be efficient in operation, but will reduce to a minimum any damage incidental to explosion, should such action occur.

Having thus described my invention, what I claim is:

1. The combination with a blow pipe having a tip and inlet ports, of a casing remote from said tip and communicating with one of said ports, means for supplying gas to said casing, a conduit communicating with the other port and located within the casing and forming therewith a passageway restricted in width to prevent the propagation of flame therethrough, and means for supplying gas to said conduit.

2. The combination, with a blow pipe having a tip and inlet ports, of a casing remote from said tip and communicating with one of said ports, a conduit within said casing and forming therewith a passageway restricted in width to prevent the propagation of flame therethrough and communicating with the other port, means for supplying gas to the restricted space between said conduit and casing, and means for supplying another gas to the conduit within said casing.

3. The combination, with a blow pipe having a tip and inlet ports, of a casing remote from said tip and communicating with one of said ports, a conduit within said casing and forming therewith an annular passageway restricted in width to prevent the propagation of flame therethrough, filling material in said conduit, means for supplying oxygen to said conduit, and means for supplying acetylene to the annular space between said conduit and casing.

4. The combination, with a blow pipe having a tip and inlet ports, of a casing remote from said tip and communicating with one of said ports, an elongated conduit within said casing and forming therewith an elongated annular passageway restricted in width to prevent the propagation of flame therethrough, a filling of pumice stone in said conduit, means for supplying oxygen to said conduit, and means for supplying acetylene to the annular space between said conduit and casing.

5. The combination, with a blow pipe provided with an inlet projection having a pair of ports and provided with an annular recess in the outer end thereof, of a casing having an end fitting in said recess and communicating with one of said ports, packing material in said recess, a conduit within said casing forming therewith an annular passageway and communicating with the other port, means for supplying gas to said conduit, means for supplying another gas to the space between said conduit and casing, and means for adjusting said casing to force the end thereof into said recess.

6. The combination, with a blow pipe provided with an inlet projection having a pair of ports, of a casing having an end fitting said projection and communicating with one of said ports, a conduit within said casing forming therewith a passageway and communicating with the other port, means for supplying gas to said conduit, means for supplying another gas to the space between said conduit and casing, and means for adjusting said casing to form a tight joint with said projection.

7. The combination, with a blow pipe having a projection provided with a pair of ports, of a casing carried by said projection and having at the end remote therefrom a closure, said casing communicating with one of said ports, a conduit within said casing forming therewith a passageway and communicating with the other port, said conduit being provided with an inlet connection extending through said closure, a second connection carried by the closure, and means on the first mentioned connection for adjusting the casing toward and from the blow pipe.

8. The combination, with a blow pipe having a pair of inlet ports, of a casing communicating with one of said ports, a conduit in said casing forming therewith a passageway and communicating with the other port, a plug closing each end of said conduit, each of said plugs being provided with a bore therethrough and each being provided beyond the conduit with a centering flange engaging the casing, each of said flanges being provided with one or more ports, means for supplying a gas to said conduit, and means for supplying a gas to said casing beyond the flange which is remote from the blow pipe.

9. The combination, with a blow pipe having a pair of gas supply connections, of a valve for each of said connections, a valve fitting comprising a pair of valves, flexible pipes extending between the said connections and said fitting, and means whereby the valves in said fitting may be operated simultaneously.

10. The combination, with a blow pipe having a pair of connections and a valve for each connection, of a valve fitting comprising a pair of valves, intermeshing gears carried by the latter valves, operating means for one of said gears, and flexible pipes connecting the latter valves with the aforesaid connections.

11. The combination, with a blow pipe having a pair of connections and a valve for each connection, of a valve fitting comprising a pair of valves, means for operating said valves, flexible pipes connecting the latter valves with the aforesaid connections, and a check valve interposed between each of the latter valves and its flexible pipe.

12. The combination, with a blow pipe having a pair of supply connections, of a valve fitting having a pair of check valves, and flexible pipes connecting said check valves with said connections.

13. The combination, with a blow pipe having a pair of supply connections and a valve for each connection, of a valve fitting having a pair of check valves, and flexible pipes connecting said check valves with said connections.

14. The combination, with a blow pipe comprising a casing having a pair of lateral inlet ports, of a casing rotatably connected with the former casing and projecting laterally therefrom and provided with a pair of passageways communicating with said ports respectively, connections projecting from the latter casing, and flexible pipes for such connections.

15. The combination, with a blow pipe provided with an inlet projection having a pair of ports, of a casing connected at one end to said projection and communicating with one of said ports, a conduit within said casing forming therewith a passageway restricted in width to prevent propagation of flame therethrough and communicating with the other port, means for supplying gas to the restricted space between the conduit and casing, and means for supplying another gas to the conduit within the casing.

In testimony whereof, I hereunto affix my signature in the presence of two witnesses.

JOHN HARRIS.

Witnesses:
  J. B. HULL,
  BRENNAN B. WEST.